US010769597B2

(12) United States Patent
Li

(10) Patent No.: US 10,769,597 B2
(45) Date of Patent: Sep. 8, 2020

(54) DATA PROCESSING METHOD AND DEVICE, AND POS TRANSACTION SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 224 days.

(21) Appl. No.: 15/876,782

(22) Filed: Jan. 22, 2018

(65) Prior Publication Data

US 2018/0144310 A1    May 24, 2018

Related U.S. Application Data

(63) Continuation of application No. PCT/CN2016/090989, filed on Jul. 22, 2016.

(30) Foreign Application Priority Data

Jul. 22, 2015  (CN) .......................... 2015 1 0435057
Jul. 22, 2015  (CN) .......................... 2015 1 0435058
Jul. 22, 2015  (CN) .......................... 2015 1 0435172

(51) Int. Cl.
*G06Q 20/04*         (2012.01)
*G07G 1/14*          (2006.01)
(Continued)

(52) U.S. Cl.
CPC ............... *G06Q 20/04* (2013.01); *G06F 8/61* (2013.01); *G06Q 20/20* (2013.01); *G06Q 20/204* (2013.01);
(Continued)

(58) Field of Classification Search
CPC ...... G06Q 20/04; G06Q 20/20; G06Q 20/401; G06Q 20/341; G06Q 20/204; G07G 1/14; H04L 9/3247; H04L 63/0428; G06F 8/61
See application file for complete search history.

(56) References Cited

U.S. PATENT DOCUMENTS

2003/0154139 A1      8/2003  Woo
2017/0178116 A1*     6/2017  Savolainen .......... G06Q 20/202

FOREIGN PATENT DOCUMENTS

CN         101329801  A      12/2008
CN         102411819  A  *    4/2012
(Continued)

OTHER PUBLICATIONS

International Search Report dated Oct. 10, 2016 for corresponding International Application No. PCT/CN2016/090989, filed Jul. 22, 2016.
(Continued)

*Primary Examiner* — Sonji N Johnson
(74) *Attorney, Agent, or Firm* — BakerHostetler

(57) ABSTRACT

A data processing method and device, and a POS transaction system are provided. The method includes the following. Card information pre-stored in a chip card transacting with the POS terminal is read. The card information includes information of a program set for processing transaction data of the chip card. One or more transaction programs matching with a current transaction are acquired in the program set according to the card information. The one or more transaction programs run to calculate and transmit transaction data of the current transaction.

15 Claims, 8 Drawing Sheets

(51) Int. Cl.
*G06Q 20/20* (2012.01)
*G06F 8/61* (2018.01)
*G06Q 20/34* (2012.01)
*G06Q 20/40* (2012.01)
*H04L 9/32* (2006.01)
*H04L 29/06* (2006.01)

(52) U.S. Cl.
CPC ......... *G06Q 20/341* (2013.01); *G06Q 20/401* (2013.01); *G07G 1/14* (2013.01); *H04L 9/3247* (2013.01); *H04L 63/0428* (2013.01)

(56) References Cited

FOREIGN PATENT DOCUMENTS

| | | |
|---|---|---|
| CN | 102411819 A | 4/2012 |
| CN | 103942684 A | 7/2014 |
| CN | 105023150 A | 11/2015 |
| CN | 105023151 A | 11/2015 |
| CN | 105023374 A | 11/2015 |

OTHER PUBLICATIONS

Written Opinion of the International Searching Authority dated Oct. 10, 2016 for corresponding International Application No. PCT/CN2016/090989, filed Jul. 22, 2016.

* cited by examiner

DATA PROCESSING METHOD AND DEVICE, AND POS TRANSACTION SYSTEM

CROSS-REFERENCE TO RELATED APPLICATION

This application is a continuation of International Application PCT/CN2016/090989, which claims priority to Chinese Patent Application No. 201510435057.9, filed on Jul. 22, 2015, Chinese Patent Application No. 201510435058.3, filed on Jul. 22, 2015, and Chinese Patent Application No. 201510435172.6, filed on Jul. 22, 2015, the entire contents of which are incorporated herein by reference.

TECHNICAL FIELD

The present disclosure relates to the field of Internet technology, and particular to, a data processing method, a data processing device and a POS transaction system.

BACKGROUND

Point Of Sale (POS) terminal is a multi-function terminal whose main task is to provide data services and management functions for goods and media transactions and perform non-cash settlement. With developments of payment ways such as bank cards, the POS terminal is becoming more widely used.

A working principle of the POS terminal is to read card information of a card, such as the bank card, through a card reader. A transaction amount is input by an operator of the POS terminal, and a personal identification number (PIN) is input by a holder of the bank card. The POS terminal sends these information to a bank system for issuing the bank card through a payment platform, such as China UnionPay Center, to realize an online transaction, to provide a message indicating whether the transaction is successful or not, and to print a corresponding bill. A usage of the POS terminal realizes the online transaction of the bank card, such as a credit card or a debit card, thereby guaranteeing security, quickness and accuracy of the transaction, avoiding complicated works, such as manually checking blacklist and pressure sheets, and improving work efficiency.

However, more types of cards exist and theirs issuing agencies are different. In addition to bank-issued financial cards, frequently-used cards may include: transportation cards issued by municipal departments, shopping cards, prepaid cards, membership cards and the like issued by merchants. Due to different functions supported by the cards, in related arts, a plurality of POS terminals may be installed to separately process transaction functions of the cards. Therefore, in some merchants, especially in large-scale supermarkets, the plurality of POS terminals are generally needed at a checkout station. On the one hand, inconvenience of a card-swiping transaction is caused to complete the transaction, and on the other hand, a transaction cost of the merchants is increased.

SUMMARY

A data processing method, applied to a POS terminal, includes: reading card information pre-stored in a chip card transacting with the POS terminal, in which the card information includes information of a program set for processing transaction data of the chip card; acquiring one or more transaction programs matching with a current transaction in the program set according to the card information; and running the one or more transaction programs to calculate and transmit the transaction data.

A method is for processing card-swiping transaction data and includes: acquiring transaction data uploaded by a POS terminal; determining a target transaction background server corresponding to the transaction data; transmitting the transaction data to the target transaction background server, such that the target transaction background server performs an authorization operation on the transaction data; and receiving an authorization response message of the target transaction background server in response to the transaction data and forwarding the authorization response message of the target transaction background server in response to the transaction data, to the POS terminal.

A data processing device, applied to a POS terminal, includes: a memory having computer-executable instructions stored thereon; and a processor, which is configured by the instructions to implement at least one of: a card reading module, configured to read card information pre-stored in a chip card transacting with the POS terminal, in which the card information includes information of a program set for processing transaction data of the chip card; a program acquiring module, configured to acquire one or more transaction programs matching with a current transaction in the program set according to the card information; and an executing module, configured to run the one or more transaction programs to calculate and transmit the transaction data.

A data processing device, for processing card-swiping transaction data, includes: a memory having computer-executable instructions stored thereon; and a processor, which is configured by the instructions to implement at least one of: a transaction data acquiring module, configured to acquire transaction data uploaded by a POS terminal; a background determining module, configured to determine a target transaction background server corresponding to the transaction data; a background data transmitting module, configured to transmit the transaction data to the target transaction background server, such that an authorization operation is performed on the transaction data by the target transaction background server; and a POS terminal data transmitting module, configured to receive and forward an authorization response message of the target transaction background server in response to the transaction data to the POS terminal.

A POS transaction system includes a POS management server and a POS terminal. The POS terminal is configured to receive transaction information input externally and a verification value of the transaction information verified by a chip card transacting with the POS terminal, to package the verification value, the transaction information and an identifier of the POS terminal as transaction data, to send the transaction data to the POS management server and to receive authorization response message from the POS management server. The POS management server is communicatively connected to the POS terminal and communicatively connected to a plurality of transaction background servers via network, and the POS management server is configured to receive the transaction data, to determine a target transaction background server corresponding to the transaction data from the plurality of transaction background servers, to transmit the transaction data to the target transaction background server, such that an authentication operation is performed on the transaction data by the target transaction background server, and to receive and forward the authorization response message of the target transaction background server in response to the transaction data to the POS terminal.

The present disclosure further provides a computer product. When the computer program is executed by a processor, the first data processing method is executed.

The present disclosure further provides a computer product. When the computer program is executed by a processor, the second data processing method is executed.

The above and other objectives, advantages and features of the present disclosure will become more apparent to one of ordinary skill in the art from following detailed descriptions of the embodiments of the present disclosure in combination with the accompanying drawings.

BRIEF DESCRIPTION OF THE DRAWINGS

Hereinafter, some specific embodiments of the present disclosure will be described in detail, by way of example and not limitation, with reference to the drawings. Same or similar parts or portions are labelled with same reference numbers in the drawings. It may be understood by those skilled in the art that the drawings are not necessarily drawn to scale, in which.

DETAILED DESCRIPTION

Figure 1:
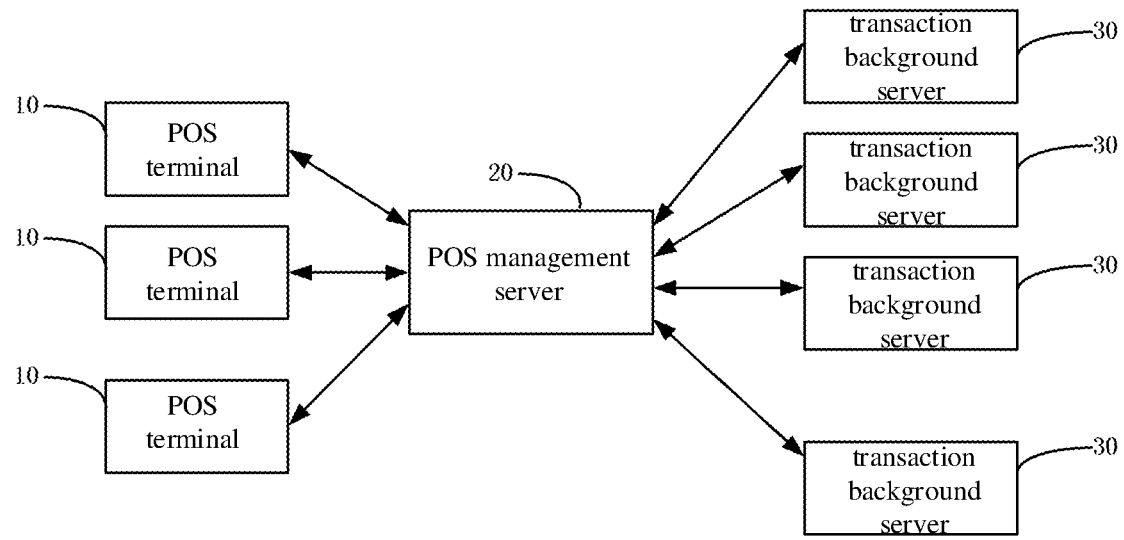
FIG. 1 is a schematic diagram of a POS transaction system according to an embodiment of the present disclosure.

FIG. 1 is a schematic diagram of a POS transaction system according to an embodiment of the present disclosure. Generally, the POS transaction system includes one or more POS terminals 10 and a POS management server 20. The POS terminal 10 serves as a processing terminal of the card-swiping transaction to receive transaction information input externally and perform data interaction with a chip card. The POS management server 20 is communicatively connected to the POS terminal 10 and a transaction background server 30 respectively. On one hand, the POS management server 20 is configured to forward transaction data, functioning as a forwarding node between the POS terminal 10 and the transaction background server 30. On other hand, the POS management server 20 further functions as a management platform of the POS terminal 10 and is configured to securely authorize the POS terminal 10 and to provide an extended support of one or more transaction programs. Each POS terminal 10 has a unique identifier for identifying by the POS management server 20.

In the above system, the POS terminal 10 is different from a conventional POS terminal in related arts in that the POS terminal 10 in the present disclosure does not store a transaction key used for transactions therein and is configured to only package the transaction data. The POS terminal 10 is arranged at a checkout counter of the merchants for example a community bank, a bank hall, a convenience branches, a restaurant, a chain store, a shopping mall, or the like. The POS management server 20 may process data of the POS terminal 10 which is secure authenticated successfully and within a management range of the POS management server 20. Before the transaction, the POS management server 20 performances secure controls in multiple aspects, such as transmission, data legitimacy, data integrity and terminal security certification by means of Certificate Authority (CA) and digital certificate, to avoid an access of an illegal POS terminal, thereby guaranteeing security environment of the POS terminal and meeting higher financial security payment requirements. The POS management server 20 may further provide a download and update service of the one or more transaction programs for the POS terminal 10. The POS management server 20 determines a corresponding transaction background server (such as Financial Institution, Payment Platform and the like) from a plurality of transaction background servers 30 as a target transaction background server according to a type of the chip card received by the POS terminal 10 (the type of the chip card may be determined according to an identifier of the one or more transaction programs running in the POS terminal 10 and processing a current transaction of the chip card), to forward data between the target transaction background server 30 and the POS terminal 10.

Figure 2:
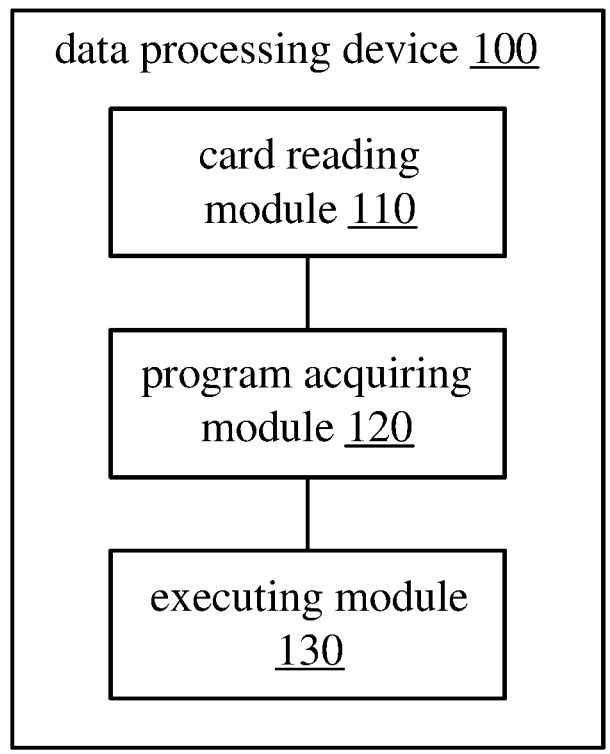
FIG. 2 is a block diagram of a data processing device according to an embodiment of the present disclosure.

FIG. 2 is a block diagram of a data processing device 100 according to an embodiment of the present disclosure. The data processing device 100 may be arranged in the POS terminal 10 of the POS transaction system illustrated as FIG. 1, to process transaction data of different types of chip cards. The data processing device 100 generally includes a card reading module 110, a program acquiring module 120 and an executing module 130. The card reading module 110 is configured to read card information pre-stored in the chip card transacting with the POS terminal 10. The card information includes information of a program set for processing transaction data of the chip card. For example, the program set may be configured to realize various businesses supported by the chip card transacting with the POS terminal 10. The program set at least includes one or more transaction programs. Each of the one or more transaction programs is configured to realize one or more of the above businesses. The information of the program set may be recorded into a list of supported programs pre-stored in the chip card, which may include identifiers of the programs, names of the programs, versions of the programs and the like. With the information of the program set, the one or more transaction programs included in the corresponding program set may be determined.

The program acquiring module 120 is configured to acquire one or more transaction programs matching with a current transaction according to the card information. The one or more transaction programs may be one or more programs included in the program set stored in the card information. The program acquiring module 120 may extract the information of the above program set from the card information, and read the one or more transaction programs matching with the current transaction from the POS terminal 10 by using the information of the program set, or download and install the one or more corresponding transaction programs when there is no transaction program matching with the current transaction in the POS terminal 10. The executing module 130 may be configured to run the one or more transaction programs acquired by the program acquiring module 120 to calculate and transmit the transaction data.

In the data processing device 100 according to embodiments of the present disclosure, the card information pre-stored in the chip card is firstly read by the card reading module 110. The one or more transaction programs for processing the transaction data of the current chip card are determined by the program acquiring module 120 by using the information of the program set in the card information. The transaction data is calculated and transmitted by the executing module 130 by running the one or more transaction programs determined. Different programs can run on the same POS terminal 10, such that transaction data of different types of chip cards may be processed, thereby improving convenience of the card-swiping transaction and reducing transaction cost of the merchants.

Figure 3:
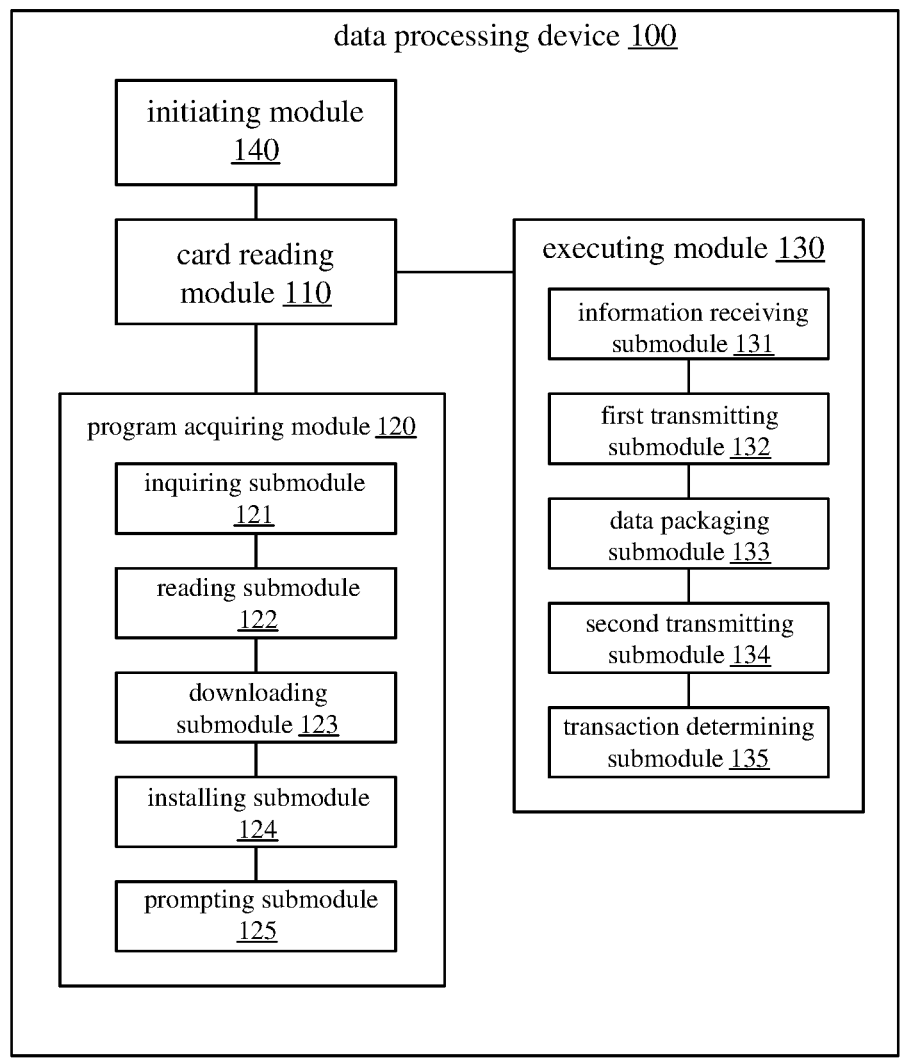
FIG. 3 is a block diagram of a data processing device according to another embodiment of the present disclosure.

FIG. 3 is a block diagram of a data processing device 100 according to another embodiment of the present disclosure. The data processing device 100 according to the embodiment includes an initiating module 140 compared with the data processing device according to the above embodiment. The initiating module 140 is configured to send an authentication request to the POS management server 20 communicatively connected to the POS terminal 10, and to set the POS terminal 10 as a transaction allowable state after a response message indicating a success authentication sent by the POS management server 20 is received. The initiating module 140 may be used for the POS management server 20 to authenticate the POS terminal 10, to avoid an access of the illegal POS terminal to the POS management server 20. For example, the initiating module 140 may be used to manage, if necessary, a newly added POS terminal 10 for the POS management server 20, such that the POS terminal 10 may be extended and added according to requirements.

In an alternative implementing solution of embodiments of the present disclosure, the program acquiring module 120 may be optionally configured with an inquiring submodule 121, a reading submodule 122, a downloading submodule 123 and an installing submodule 124. The executing module 130 may be optionally configured with an information receiving submodule 131, a first transmitting submodule 132, a data packaging submodule 133, a second transmitting submodule 134 and a transaction determining submodule 135.

In the program acquiring module 120 of the data processing device 100 according to embodiments of the present disclosure, the inquiring submodule 121 may be configured to inquire whether the one or more transaction programs have been installed in the POS terminal 10 according to the card information. The inquiring submodule 121 may be configured to inquire in a program memory of the POS terminal 10 by using the information of the program set in the card information, and to acquire the one or more transaction programs in a corresponding manner according to an inquired result.

The reading submodule 122 may be configured to read the one or more installed transaction programs matching with the current transaction when it is inquired by the inquiring submodule 121 that the one or more transaction programs have been installed. That is, the reading submodule 122 may invoke interfaces of the one or more installed transaction programs when the one or more installed transaction programs included in the program set that is supported by the chip card have been already installed in the POS terminal 10.

The downloading submodule 123 may be configured to, when it is inquired by the inquiring submodule 121 that the one or more transaction programs have not been installed, send a download request of the one or more transaction programs to the POS management server 20 communicatively connected to the POS terminal 10, and receive an installation package returned by the POS management server 20 in response to the download request. The downloading submodule 123 makes it possible to automatically install the transaction programs in the POS terminal 10. The downloading submodule 123 may transmit data via a secure transmission path pre-established between the POS terminal 10 and the POS management server 20.

The installing submodule 124 may be configured to install the one or more transaction programs by using installation package downloaded by the downloading submodule 123, such that the one or more transaction programs installed can process the current transaction. During an installation process, the installing submodule 124 may guarantee security and integrity of the installation package via a preset verification manner, to improve reliability. The installing submodule 124 is further configured to verify a digital signature included in the installation package. Furthermore, the installing submodule 124 is configured to decrypt the installation package to obtain an installation data plaintext after the digital signature is verified successfully. In addition, the installing submodule 124 is configured to verify a data format of the installation data plaintext, and to install the one or more transaction programs by using the installation data plaintext verified successfully.

An alternative implementation of decrypting the installation package by the installing submodule 124 may include the followings. A digital envelope of the installation package is opened to obtain a key ciphertext and an information ciphertext. Furthermore, the key ciphertext included in the installation package is decrypted with a pre-stored privacy key to obtain a session key plaintext. The key ciphertext is encrypted with a public key corresponding to the pre-stored privacy key by the POS management server 20. In addition, the information ciphertext included in the installation package is decrypted with the session key plaintext to obtain the installation data plaintext.

In an alternative implementing solution of embodiments of the present disclosure, the program acquiring module 120 may further include a prompting submodule 125. The prompting submodule 125 is configured to output an error prompt message in a case that the digital signature is verified unsuccessfully or the data format of the installation data plaintext is verified unsuccessfully. In addition, if the digital signature is verified unsuccessfully or the data format of the installation data plaintext is verified unsuccessfully, the installation package may be downloaded again by the downloading submodule 123 according to a preset strategy. For example, the installation package may be downloaded for preset times, and the error prompt message is output if all the installation packages downloaded after the preset times are verified unsuccessfully. The error prompt message may be output by a display screen or a prompt of the POS terminal 10.

With the alternative implementation, functions of the POS terminal 10 and the POS management server 20 may be extended, such that the POS terminal 10 may download the one or more transaction programs through the POS management server 20, to support transaction functions of various types of chip cards.

In an alternative implementation of the executing module 130 of the data processing device 100 according to embodiments of the present disclosure, the executing module 130 may include the information receiving submodule 131, the first transmitting submodule 132, the data packaging submodule 133 and the second transmitting submodule 134. The information receiving submodule 131 may be configured to receive transaction information from an interactive interface of the POS terminal 10. The transaction information may include a transaction type, a transaction amount, PIN (Personal Identification Number) and the like. The above mentioned chip card may include various financial cards, prepaid cards, membership cards or the like. Various chip cards may perform data interaction with their corresponding transaction background servers to realize transaction functions such as payment, transferring, refund, recharging and the like. Transactions of different chip cards may be processed by different transaction programs. These transaction programs may be implemented as an integrated program set, or as a plurality of separate programs. The information receiving submodule 131 may receive user's operations from a keyboard, a touch screen and the like, to acquire the information input.

The first transmitting submodule 132 and the second transmitting submodule 134 are configured to perform data interactions with the chip card and with the POS management server 20 respectively. The first transmitting submodule 132 is configured to transmit the transaction information to the chip card, and to acquire a verification value of the transaction information verified by the chip card. Furthermore, the first transmitting submodule 132 is configured to, after an authorization response message of the target transaction background server 30 in response to the transaction information is forwarded by the POS management server 20, send the authorization response message to the chip card such that the chip card verifies a transaction result according to the authorization response message.

The data packaging submodule 133 is configured to generate the transaction data according to a format arranged by the one or more transaction programs. The transaction data at least includes: the verification value, the transaction information, an identifier of the POS terminal and the like. Moreover, the transaction data may further includes a transaction currency type, transaction time and an identifier of the one or more transaction programs. The verification value is a result generated after the chip card processes. The transaction information may include a personal identification number (PIN), a transaction type and a transaction amount input by an operator of the current transaction or a holder of the chip card.

The second transmitting submodule 134 may be configured to transmit the transaction data to the POS management server 20 such that the POS management server 20 transmits the transaction data to the target transaction background server 30 corresponding to the transaction data, and to receive the authorization response message from the target transaction background server 30 in response to the transaction data and forwarded by the POS management server 20.

In addition, in order to facilitate determining the target transaction background server by the POS management server 20, the data processing device 100 may further upload the identifier of one or more currently used transaction programs to the POS management server 20, such that the POS management server 20 may determine a transaction background server required in transmitting the transaction data among the plurality of transaction background servers 30 by using the identifier of the one or more transaction programs. In other words, the identifier of the one or more transaction programs is used to select the target transaction background server corresponding to the transaction data. The above identifier of the one or more transaction programs may be included in the transaction data and uploaded by the POS terminal 10. Alternatively, the identifier of the one or more transaction programs may be separately uploaded by the POS terminal 10 before the transaction data transmission between the POS terminal 10 and the POS management server 20. The POS management server 20 may store in advance a correspondence relation between the identifiers of the transaction programs and the transaction background servers 30. The correspondence relation includes the identifier of a respective transaction program and information (such as name, network address, connection interface) of the target transaction background server 30 corresponding to the respective transaction program.

After the authorization response message is sent to the chip card by the first transmitting submodule 132, it means the transaction procedure is completed for certain types of transactions. For some types of transactions and chip cards, the executing module 130 further includes a transaction determining submodule 135. The transaction determining submodule 135 is configured to determine whether the current transaction is completed according to a response of the chip card to the authorization response message, and to transmit result data indicating whether the current transaction is completed to the POS management server 20, such that the POS management server 20 sends a report to the target transaction background server 30 when it is determined that the transaction is completed according to the result data. The target transaction background server 30 makes a settlement and record according to final transaction result data. For example, if the chip card verifies successfully the authorization response message and accepts the current transaction, a transaction result feedback may be returned to the POS terminal 10 for parsing and reporting. If the chip card does not verify successfully the authorization response message and does not accept the current transaction, no response may be returned to the POS terminal 10 or a refusal feedback of the current transaction is returned to the POS terminal 10. After the POS terminal receives the transaction result feedback or the refusal feedback of the current transaction within a preset time period, transaction failure information may be sent to the target transaction background server 30.

Figure 4:
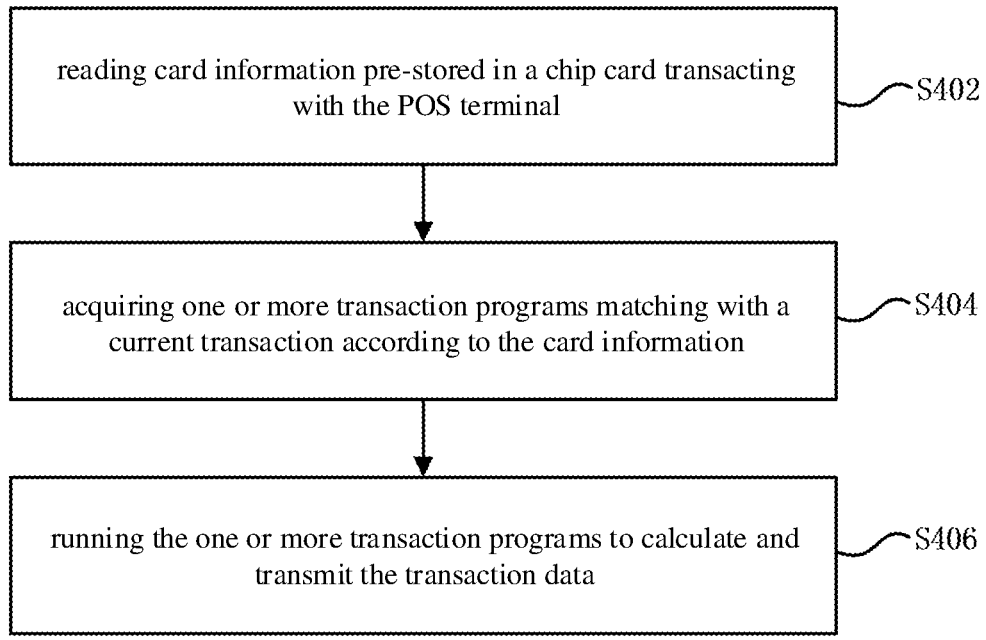
FIG. 4 is a flow chart of a data processing method according to an embodiment of the present disclosure.

Embodiments of the present disclosure further provide a data processing method, applied to a POS terminal, and executable by the data processing device 100 according to any one of embodiments mentioned above, to process the transaction data of the chip card, thereby improving convenience of the card-swiping transaction. FIG. 4 is a flow chart of a data processing method according to an embodiment of the present disclosure. The data processing method generally includes the following.

In step S402, card information pre-stored in the chip card transacting with the POS terminal is read.

In step S404, one or more transaction programs matching with a current transaction are acquired according to the card information.

In step S406, the one or more transaction programs runs to calculate and transmit the transaction data.

The above chip card may include financial cards, prepaid cards, membership cards or the like. Various chip cards may perform data interaction with their corresponding transaction background servers to realize transaction functions such as payment, transferring, refund, recharging and the like.

The card information pre-stored in the chip card includes the information of a program set for processing the transaction data of the chip card. For example, the one or more transaction programs included in the program set may be configured to realize various businesses supported by the chip card transacting with the POS terminal 10. The program set at least includes one or more transaction programs. Each transaction program is configured to realize one or more of the above businesses. The one or more transaction programs mentioned in block S404 is one or more program for processing transaction data of the current transaction included in the program set. The information of the program set may be recorded in a list of supported programs pre-stored in the chip card, which may include identifiers of programs, names of the programs, versions of the programs and the like. With the information of the program information, the one or more transaction programs included in the corresponding program set may be determined.

Before the block S402, an authentication request may be sent to a POS management server communicatively connected to the POS terminal. After a feedback message indicating a success authentication which is sent by the POS management server is received, the POS terminal is set as a transaction allowable state. The authentication process may be started after the POS terminal is installed initially. The authentication request may include an identifier of the POS terminal, a certification and the like. The authentication request may be set via a pre-established secure path.

The information of the above program set may be extracted from the card information in the block S404. With the information of the program set, the one or more corresponding transaction programs may be read from the POS terminal or the one or more corresponding transaction programs may be downloaded and installed when the one or more corresponding transaction programs are not prearranged in the POS terminal. An alternative implementation may be described as follows. It is inquired whether the one or more transaction programs have been installed according to the card information. If the one or more transaction programs have been installed, the one or more transaction programs installed are read. If the one or more transaction programs have not been installed, a download request of the one or more transaction programs is sent to the POS management server communicatively connected to the POS terminal, and an installation package returned by the POS management server in response to the download request is received to install the one or more transaction programs with the installation package.

After the installation package is downloaded in the block S404, installing the one or more transaction programs with the installation package may include the followings. A digital signature included in the installation package is verified. After the digital signature is verified successfully, the installation package is decrypted to obtain an installation data plaintext. In addition, a data format of the installation data plaintext is verified, and the one or more transaction programs are installed by using the installation data plaintext verified successfully. If the digital signature is verified unsuccessfully or the data format of the installation data plaintext is verified unsuccessfully, an error prompt message may be output. Furthermore, if an occasion that the digital signature is verified unsuccessfully or the data format of the installation data plaintext is verified unsuccessfully occurs, a strategy, such as a download may be performed for preset times, may be performed, to improve reliability of downloading the installation package.

With the alternative implementation, functions of the POS terminal 10 and the POS management server 20 may be extended, such that the POS terminal 10 may download the one or more transaction programs through the POS management server 20, to support transaction functions of various types of chip cards.

An alternative implementation of decrypting the installation package may be described as follows. A digital envelope of the installation package is opened to obtain a key ciphertext and an information ciphertext. The key ciphertext included in the installation package is encrypted with a pre-stored privacy key to obtain a session key plaintext. The key ciphertext is encrypted with a public key corresponding to the pre-stored privacy key by the POS management server. The information ciphertext included in the installation package is decrypted with the session key plaintext to obtain the installation data plaintext.

After the one or more transaction programs are acquired in the block S404, the transaction of the chip card may be processed in the block S406. Transaction information from an interactive interface of the POS terminal may be received firstly. The above interactive interface may be a keyboard or a touch screen of the POS terminal and the like. The transaction information may include a personal identification number (PIN), a transaction type, a transaction amount input by an operator of the current transaction or a holder of the chip card.

During a calculation and transmission process of the transaction data in the block S406, the above transaction information may be transmitted to the chip card firstly and transaction data is generated according to a preset format of the one or more transaction programs. The transaction data at least includes the above verification value, the transaction information and an identifier of the POS terminal. Alternatively, some transaction data may include a transaction currency type, transaction time, an identifier of the one or more transaction programs and the like. The transaction data is transmitted by the POS terminal to the POS management server for transmitting the transaction data by the POS management server to a target transaction background server corresponding to the transaction data. An authorization response message from the target transaction background server in response to the transaction data and forwarded by the POS management server is received. The authorization response message is sent to the chip card for verifying a transaction result by the chip card according to the authorization response message.

For certain types of transactions, it means that the transaction produce is completed after the chip card confirms the transaction. For some types of transactions, after the authorization response message is sent to the chip card, a feedback message may be generated by the chip card for a settlement, such that the target transaction background server completes the settlement. Under this type of transaction, after the authorization response message is sent to the chip card by the POS terminal 10, it may be determined whether the current transaction is completed according to a response of the chip card to the authorization response message. Result data indicating whether the current transaction is completed is transmitted to the POS management server 20, such that the POS management server 20 may send a report to the target transaction background server 30 when it is determined that the transaction is completed according to the result data. The target transaction background server 30 makes a settlement and record according to final transaction result data. For example, if the chip card verifies successfully the authorization response message and accepts the current transaction, a transaction result feedback may be returned to the POS terminal 10 for parsing and reporting. If the chip card does not verify successfully the authorization response message and does not accept the current transaction, no response may be returned by the POS terminal 10 or a refusal feedback of the current transaction is returned. After the POS terminal receives the transaction result feedback or the refusal feedback of the current transaction within a preset time period, transaction failure information may be sent to the target transaction background server 30.

In addition, in order to facilitate determining the target transaction background server by the POS management server 20, an identifier of one or more currently used transaction programs may be uploaded to the POS management server 20 by the POS terminal, such that the POS management server 20 determines a transaction background server required in transmitting the transaction data among the plurality of transaction background servers 30 by using the identifier of the one or more transaction programs. In other words, the identifier of the one or more transaction programs is used to select the target transaction background server corresponding to the transaction data. The above identifier of the one or more transaction programs may be included in the transaction data and uploaded by the POS terminal 10. Alternatively, the identifier of the one or more transaction programs may be separately uploaded by the POS terminal 10 before the transaction data transmission between the POS terminal 10 and the POS management server 20. The POS management server 20 may store in advance a correspondence between the identifiers of the transaction programs and the transaction background servers 30. The correspondence includes the identifier of a respective transaction program and information (such as name, network address, connection interface) of the target transaction background server 30 corresponding to the respective transaction program.

As can be seen from the above descriptions, with the data processing method according to embodiments of the present disclosure, the one or more transaction programs for processing the transaction data of the current chip card are determined by means of the information of the program set included in the card information. The transaction data is calculated and transmitted by running the one or more transaction programs. Different transaction programs may run on the same POS terminal, such that transaction data of different types of chip cards may be processed, thereby improving the convenience of the card-swiping transaction for the user and saving the transaction cost of the merchants. Furthermore, during a transaction process, the data processing method according to embodiments of the present disclosure may adopt various security arrangements to guarantee security of transaction.

Further, in the data processing method according to embodiments of the present disclosure, an un-configured transaction program is downloaded by the POS terminal from the POS management server, thereby improving extensibility of the POS terminal and improving flexibility of the POS terminal.

Figure 5:
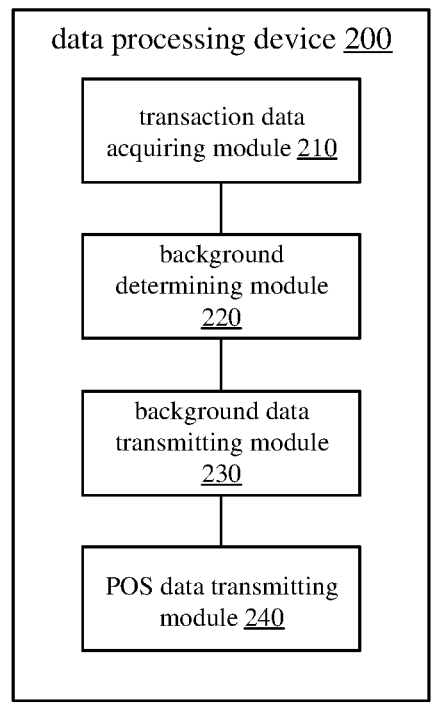
FIG. 5 is a block diagram of a data processing device 200 according to an embodiment of the present disclosure.

FIG. 5 is a block diagram of a data processing device 200 according to an embodiment of the present disclosure. The data processing device 200 is for processing card-swiping transaction data. The data processing device 200 may be arranged in the POS management server 20 of the system illustrated as FIG. 1, and configured to process the card-swiping transaction data sent by a plurality of POS terminals 10. The data processing device 200 generally includes a transaction data acquiring module 210, a background determining module 220, a background data transmitting module 230 and a POS data transmitting module 240. The transaction data acquiring module 210 may be configured to acquire transaction data uploaded by the POS terminal 10. The transaction data may include transaction information received through an interactive interface of the POS terminal 10 and verification information generated by performing a data interaction between the POS terminal 10 and the chip card. The above mentioned chip card may include various financial cards, prepaid cards, membership cards or the like. Various chip cards may perform data interaction with their corresponding transaction background servers to realize transaction functions such as payment, transferring, refund, recharging and the like.

The above transaction data may be generated according to a format arranged by the one or more transaction programs matching with the current transaction. The transaction data at least includes the verification value, the transaction information and an identifier of the POS terminal. Alternatively, some transaction data may further include a transaction currency type, transaction time, an identifier of the one or more transaction programs for processing the current transaction. The transaction information may include a personal identification number (PIN for short), a transaction type, a transaction amount and the like input by an operator of the current transaction or a holder of the chip card. The verification value is a value of the transaction information verified by the chip card.

The background determining module 220 may be configured to determine a target transaction background server corresponding to the transaction data. A plurality of transaction background servers may include transaction backgrounds of a bank, a third party transaction agency, a large-scale supermarket or marketplace and the like. A different transaction background server may be configured to perform an authorization operation on transactions of a certain chip card. The background data transmitting module 230 may be configured to transmit the transaction data to the selected target transaction background server 30, such that an authorization operation is performed on the transaction data by the target transaction background server.

The background determining module 220 may be configured to select the target transaction background server required in transmitting the transaction data among a plurality of transaction background servers 30 by using the identifier of the one or more transaction programs for processing the current transaction. That is, with the identifier of the one or more transaction programs, the target transaction background server 30 corresponding to the transaction data is selected. An alternative implementation of the background determining module 220 is described as follows. The identifier of the one or more transaction programs for processing the current transaction forwarded by the POS terminal may be acquired. The target transaction background server corresponding to the transaction data is selected according to the identifier of the one or more transaction programs. The above identifier of the one or more transaction programs may be included in the transaction data and uploaded by the POS terminal 10. Alternatively, the identifier of the one or more transaction programs may be separately uploaded by the POS terminal 10 before the transaction data transmission between the POS terminal 10 and the POS management server 20. The POS management server 20 may store in advance a correspondence between the identifiers of the transaction programs and the transaction background servers 30. The correspondence includes the identifier of a respective transaction program and information (such as name, network address, connection interface) of the target transaction background server 30 corresponding to the respective transaction program.

The POS data transmitting module 240 may be configured to receive and forward an authorization response message of the target transaction background server 30 in response to the transaction data to the POS terminal 10, such that the chip card confirms that the current transaction is completed.

Figure 6:
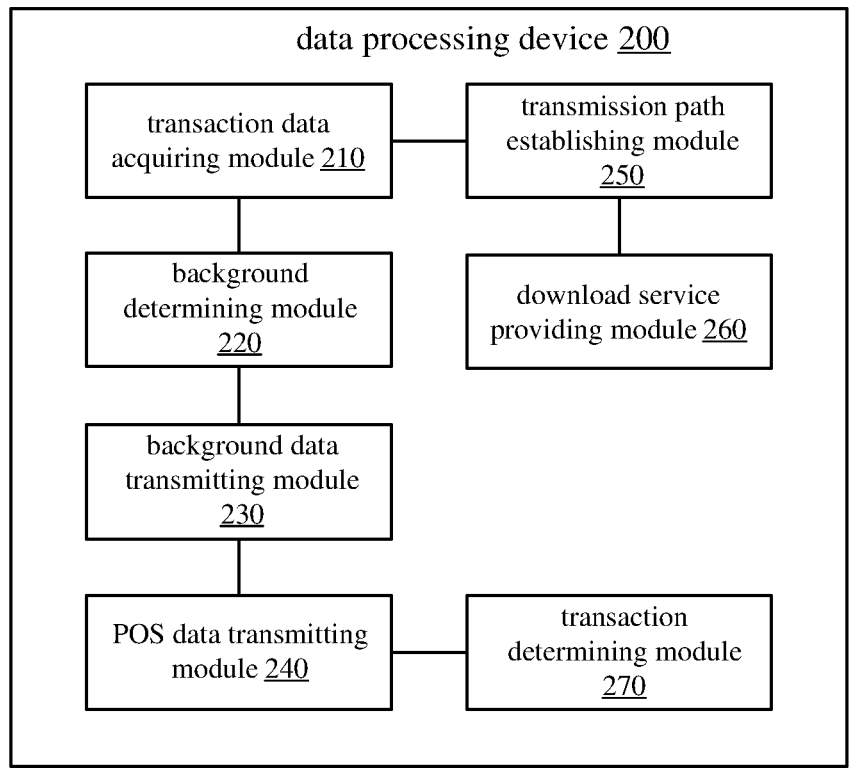
FIG. 6 is a block diagram of a data processing device 200 according to another embodiment of the present disclosure.

FIG. 6 is a block diagram of a data processing device 200 according to another embodiment of the present disclosure. As illustrated in FIG. 6, the data processing device 200 according to embodiments of the present disclosure is further, for example, configured with a transmission path establishing module 250 on the basis of the data processing device according to above embodiment. The transmission path establishing module 250 may be configured to receive an authentication request sent by the POS terminal 10, and to establish a secure transmission path with the POS terminal 10 according to the authentication request. During a process of establishing the secure transmission path, authentication information of the POS terminal 10 included in the authentication request may be acquired firstly. The authentication information of the POS terminal 10 is verified. A feedback message indicating a success authentication is returned to the POS terminal 10 if the authentication information of the POS terminal 10 is verified successfully. A pair of session keys for a security transmission with the POS terminal 10 is calculated, and the pair of session keys is provided to the POS terminal 10 for transmitting data, thereby guaranteeing security of the data transmission with the POS terminal 10.

In another alternative implementation, as illustrated in FIG. 6, the data processing device 200 may be configured with a download service providing module 260. The download service providing module 260 may be configured to receive a download request of one or more transaction programs sent by the POS terminal 10, to determine the one or more transaction programs from a pre-stored program set according to the download request, to encrypt the one or more transaction programs to generate an installation package in response to the download request, and to send the installation package to the POS terminal, such that the POS terminal installs and runs the one or more transaction programs. During the transaction, the POS terminal 10 may read the card information pre-stored in the chip card transacting with the POS terminal 10 firstly. The card information includes the information of the program set for processing the transaction data of the chip card. For example, the program set may be configured to realize various businesses supported by the chip card transacting with the POS terminal 10. The program set at least includes one or more transaction programs. Each of the one or more transaction programs is configured to realize one or more of the above businesses. The information of the program set may be recorded into a list of supported programs pre-stored in the chip chard, which may include identifiers of programs, names of the programs, versions of the programs and the like. With the information of the program set, the one or more transaction programs included in a corresponding program set may be determined. The one or more transaction programs may be one or more programs included in the program set recorded in the card information. With the alterative implementation, the functions of the POS terminal 10 and the POS management server 20 may be extended, such that the POS terminal 10 may download the one or more transaction programs through the POS management server 20, to support transaction functions of various types of chip cards.

After the information of the program set is determined, the POS terminal 10 may inquire whether the one or more transaction programs matching with the current transaction have been installed in the POS terminal 10. For example, the POS terminal 10 may inquire whether the one or more transaction programs have been installed in a program memory by using the information of the program set included in the card information, and may download the one or more transaction programs in a corresponding manner according to an inquired result. When the POS terminal 10 inquires that the one or more transaction program matching with the current transaction have been installed, the installed one or more transaction programs matching with the current transaction may be read directly. When the POS terminal 10 inquires that the one or more transaction programs matching with the current transaction have not been installed, a download request of the one or more transaction programs is sent to the POS management server 20. An installation package returned by the POS management server 20 in response to the download request is received. In this case, the download service providing module 260 may be configured to respond to the download request and to provide the installation package.

In addition to downloading the installation package according to the download request of the program set, the download service providing module 260 may be further configured to push a new installation package when there is a new version of the one or more transaction programs or there is a new POS terminal 10 accessed the transaction system.

The POS management server 20 of embodiments of the present disclosure may store various transaction programs supported by the transaction background server 30 connected to the POS management server 20, such that a transaction program database may be formed by the POS management server 20. When there is a new version of these transaction programs, the transaction programs may be updated timely, such that a download service of the one or more transaction programs may be provided according to the download request of the one or more transaction programs of the POS terminal 10.

In another alternative implementation, as illustrated in FIG. 6, the data processing device 200 may be further configured with a transaction determining module 270. The transaction determining module 270 may be configured to receive result data, sent by the POS terminal 10, indicating whether a current transaction is completed; and to send a report to the target transaction background server 30 for a settlement when it is determined that the current transaction is completed according to the result data, such that the target transaction background server completes the settlement. The above result data may be derived from a transaction confirmation feedback message of the chip card in response to the authorization response message. For example, if the chip card verifies successfully the authorization response message and accepts the current transaction, a transaction result feedback may be returned to the POS terminal 10 for parsing and reporting. If the chip card does not verify successfully the authorization response message and does not accept the current transaction, no response may be returned or a refusal feedback of the current transaction is returned. After the POS terminal receives the transaction result feedback or the refusal feedback of the current transaction within a preset time period, transaction failure information may be sent to the POS management server 20.

Figure 7:
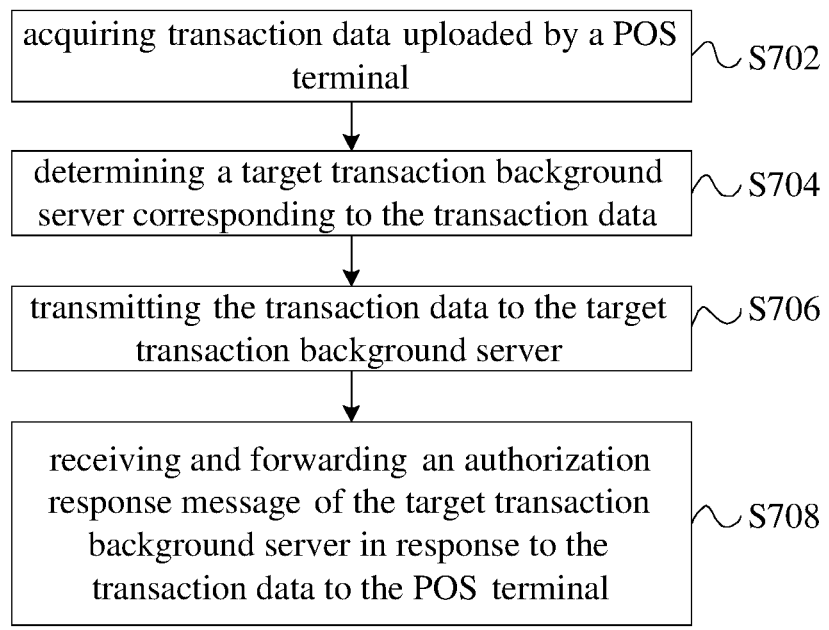
FIG. 7 is a flow chart of a data processing method according to an embodiment of the present disclosure.

Embodiments of the present disclosure also provide a data processing method. The data processing method may be applied to the POS management server 20 and executable by the data processing device 200 according to any one of the above embodiments, thereby improving the convenience of the card-swiping transaction for the user. FIG. 7 is a flow chart of a data processing method according to an embodiment of the present disclosure. The data processing method generally includes the followings.

In block S702, transaction data uploaded by the POS terminal is acquired. In block S704, a target transaction background server corresponding to the transaction data is determined.

In block S706, the transaction data is transmitted to the target transaction background server, such that the target transaction background server performs an authorization operation on the transaction data.

In block S708, an authorization response message of the target transaction background server in response to the transaction data is received and forwarded to the POS terminal.

Before the block S702, alternatively, a connection of a data path and an authorization of the POS terminal may be performed firstly, for example, an authentication request sent by the POS terminal may be received; and a secure transmission path with the POS terminal is established according to the authentication request. Establishing the secure transmission path with the POS terminal according to the authentication request may include the followings. Authentication information of the POS terminal included in the authentication request is acquired. The authentication information of the POS terminal is verified. A feedback message indicating a success authentication is returned to the POS terminal if the authentication information of the POS terminal is verified successfully. A pair of session keys for a security transmission with the POS terminal is calculated for transmitting data with the POS terminal. The pair of session keys includes an encryption key and a decryption key. The encryption key and the decryption key may be symmetric keys. During a subsequent process of transmitting data with the POS terminal, data to be sent to the POS terminal may be encrypted with the calculated encryption keys and data from the POS terminal may be decrypted with the calculated decryption key, thereby improving security of the data transmission with the POS terminal.

In a particular implementation, a first random factor (e.g. a random number) may be carried in the authentication request sent by the POS terminal. After the authentication information of the POS terminal is verified successfully, a second random factor is generated and the second random factor is carried in the feedback message to feed back to the POS terminal. The pair of session keys is generated according to the first random factor and the second random factor by adopting a preset generation algorithm. The POS terminal also generates the pair of session keys according to the first random factor and the second random factor by adopting the preset generation algorithm, and uses the pair of session keys to encrypt in the subsequent data transmission. Certainly, the present disclosure is not limited thereto. In practice, after the POS terminal may be authenticated successfully, the data processing device generates the pair of session keys according to the first random factor and the second random factor by adopting the preset generation algorithm and notify the pair of session keys to the POS terminal. Alternatively, the pair of session keys may be generated by the POS terminal and is notified to the data processing device of the POS management server 20, which is not limited in embodiments of the present disclosure.

In an alternative implementation, when the installation package of the one or more transaction programs needs to be installed in the POS terminal, a download request of the one or more transaction programs sent by the POS terminal may be received after the secure transmission path with the POS terminal is established according to the authentication request. The one or more transaction programs are determined from a pre-stored program set according to the download request. The one or more transaction programs are encrypted to generate the installation package in response to the download request. The installation package is sent to the POS terminal such that the POS terminal installs and runs the one or more transaction programs. With the alternative implementation, the installation package of the one or more transaction programs are sent to the POS terminal in response to the download request of the one or more transaction programs of the POS terminal, such that the POS terminal may process card-swiping transactions of various types of chip cards.

The block S704 may determine a transaction background server corresponding to the transaction data. The transaction background server may include a transaction background of a bank, a third party transaction agency, a large-scale supermarket or marketplace or the like. A different transaction background server may be configured to perform processing such as an authorization operation on transactions of a certain chip card. From a side of the POS terminal, for different types of chip cards, the transactions are processed by different transaction programs. Therefore, in block S704, the target transaction background server required in transmitting the current transaction data is selected among a plurality of transaction background servers by using an identifier, included in the POS terminal, of the one or more transaction programs for processing the current transaction. In other words, the identifier of the one or more transaction programs is used to select the transaction background server corresponding to the transaction data. One alternative implementation is described as follows. The identifier, uploaded by the POS terminal, of the one or more transaction programs for processing the current transaction is acquired. The target transaction background server corresponding to the transaction data is selected according to the identifier of the one or more transaction programs. The above identifier of the one or more transaction programs may be included in the transaction data and uploaded by the POS terminal 10. Alternatively, the identifier of the one or more transaction programs may be separately uploaded by the POS terminal 10 before a transmission of the transaction data between the POS terminal 10 and the POS management server 20. The POS management server may store in advance a correspondence between the identifiers of the transaction programs and the transaction background servers. The correspondence includes the identifier of a respective transaction program and information (such as name, network address, connection interface) of the target transaction background server corresponding to the respective transaction program.

In an alternative implementation, after the block S708, the followings may be executed. Result data, sent by the POS terminal, indicating whether the current transaction is completed is received. A report is sent to the target transaction background server for a settlement when it is determined that the current transaction is completed according to the result data, such that the settlement is completed by the target transaction background server. That is, after the POS terminal receives the authentication response message of the target transaction background server in response to the transaction data, verifies the target transaction background server according to context carried in the authentication response message. When the target transaction background server is successfully verified, the POS terminal determines that the current transaction is completed; otherwise, the POS terminal determines that the current transaction is not completed. The corresponding result data indicating whether the current transaction is completed is sent according to a verification result. With the alternative implementation, the security of the transaction may be further guaranteed.

As can be seen from above descriptions, according to the data processing method of the embodiments of the present disclosure, the target transaction background server is determined corresponding to the transaction data among the plurality of transaction background servers, such that the authentication operation is performed by the target transaction background server. Therefore, data forwarding between the plurality of POS terminals and the plurality of POS management servers may be realized, and different types of card-swiping transactions may be performed simultaneously by using the same POS terminal. Compared to related arts in which the POS terminal directly transacts with a transaction background connected to the POS terminal via network, the data processing method according to embodiments of the present disclosure may centrally process the transaction data of the POS terminal, thereby improving the convenience of the card-swiping transaction and reducing transaction cost of card-swiping transaction.

Further, with the data processing method according to embodiments of the present disclosure, a program support for the card-swiping transaction of the POS terminal is provided, and a download service of downloading the installation package of the one or more transaction programs is provided, so as to facilitate extending functions of the POS terminal. Furthermore, a plurality of security arrangements may be adopted to guarantee security of the data transmission, which securely controls in multiple aspects, such as transmission channel, data legitimacy, data integrity and terminal security certification, to guarantee complete and legal data interaction, thereby improving transaction security and meeting payment requirements.

Through making descriptions on the data processing method of the POS terminal 10 and the POS management server 20, it can be seen that, during the transaction, the POS terminal 10 may be configured to receive transaction information input externally and a verification value of the transaction information verified by a chip card transacting with the POS terminal, to package the verification value, the transaction information and an identifier of the POS terminal as transaction data, to send the transaction data to the POS management server and to receive an authorization response message from the POS management server. Accordingly, the POS management server 20 may be communicatively connected to a plurality of transaction background servers via network, and is configured to receive the transaction data, to determine a target transaction background server corresponding to the transaction data from the plurality of transaction background servers 30, to transmit the transaction data to the target transaction background server, such that an authentication operation is performed on the transaction data by the target transaction background server, and to receive and forward the authorization response message of the target transaction background server in response to the transaction data to the POS terminal.

The POS terminal 10, after receiving the authentication response message, may send the authentication response message to the chip card, such that the chip card confirms whether the current transaction is completed according to the authentication response message, determine whether the current transaction is completed according to a response of the chip card to the authorization response message, and transmit result data indicating whether the current transaction is completed to the POS management server, such that the POS management server sends a report to the target transaction background server when it is determined that the current transaction is completed according to the result data. Accordingly, the POS management server may receive the result data and send the report to the target transaction background server for a settlement when it is determined that the current transaction is completed according to the result data.

The POS terminal 10 may establish a secure transmission path with the POS management server 20 after the POS terminal is started and enter a transaction allowable state after the secure transmission path is established.

The POS terminal 10 may, when the secure transmission path is established, verify a channel certificate of the POS management server 20 and first authentication information of the POS management server 20, and calculate a first pair of session keys of the POS terminal 10 for use in data transmission with the POS management server 20 after the channel certificate and the first authentication information are verified. The POS management server 20 may, when the secure transmission path is established, verify second authentication information of the POS terminal 10, and calculate a second pair of session keys of the POS management server 20 for use in data transmission with the POS terminal 10 after the second authentication information is verified.

The POS terminal 10 may read card information prestored in the chip card transacting with the POS terminal after entering the transaction allowable state. The card information includes the information of the program set for processing transaction data of the chip card. The POS terminal 10 may acquire one or more transaction programs matching with the current transaction according to the card information. The one or more transaction programs are one or more programs included in the program set. The POS terminal 10 may, when the one or more transaction programs matching with the current transaction are acquired, inquire whether the one or more transaction programs have been installed according to the card information; read the one or more transaction programs installed if yes; send a download request of the one or more transaction programs to the POS management server 20 communicatively connected to the POS terminal 10 if no, receive an installation package returned by the POS management server 20 in response to the download request, and install the one or more transaction programs by using the installation package. The POS management server 20 may, when providing a download service of the installation package, receive the download request of the one or more transaction programs sent by the POS terminal 10; determine the one or more transaction programs according to the download request in the program set pre-stored; encrypt the one or more transaction programs to generate the installation package in response to the download request; and send the installation package to the POS terminal 10 for installing by the POS terminal 10. A plurality of program sets for different types of transactions provided by the plurality of transaction background server 30 are pre-stored in the POS management server 20.

Through the alternative implementation, the functions of the POS terminal 10 and the POS management server 20 may be extended, such that the POS terminal 10 may download the one or more transaction programs through the POS management server 20, to support the transaction functions of various types of chip cards.

The POS terminal 10, when the program set is installed by using the installation package, verify a digital signature included in the installation package, decrypt the installation package to obtain an installation data plaintext after the digital signature is verified successfully, verify a data format of the installation data plaintext, and install the one or more transaction programs by using the installation data plaintext verified successfully. The POS terminal 10 may, when the installation package is decrypted, open a digital envelope of the installation package to obtain a key ciphertext and an information ciphertext; and decrypt the key ciphertext included in the installation package with a pre-stored privacy key to obtain a session key plaintext. The key ciphertext is encrypted with a public key corresponding to the pre-stored privacy key by the POS management server 20. In addition, the POS terminal 10 may decrypt the information ciphertext included in the installation package with the session key plaintext of the POS management server 20 to obtain the installation data plaintext.

Figure 8:
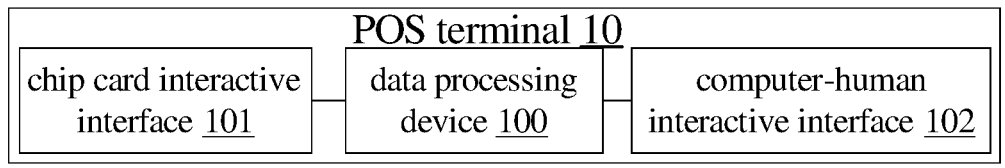
FIG. 8 is a hardware structural diagram of a POS terminal in a POS transaction system according to an embodiment of the present disclosure.

FIG. 8 is a hardware structural diagram of a POS terminal included in a POS transaction system according to an embodiment of the present disclosure. In addition to the data processing device 100 for processing data, the POS terminal 10 may further include a chip card interactive interface 101 and a computer-human interactive interface 102. The chip card interactive interface 101 may be configured to communicatively interact with the chip card via an inductive or electrical connection manner. The chip card interactive interface 101 may interact with the chip card in a connective and inductive manner. The computer-human interactive interface 102 may be configured to receive the transaction information. The transaction information may include one or more of a personal identification code, a transaction type and a transaction amount. The computer-human interactive interface 102 may be implemented as various keyboards and touch screens.

Figure 9:
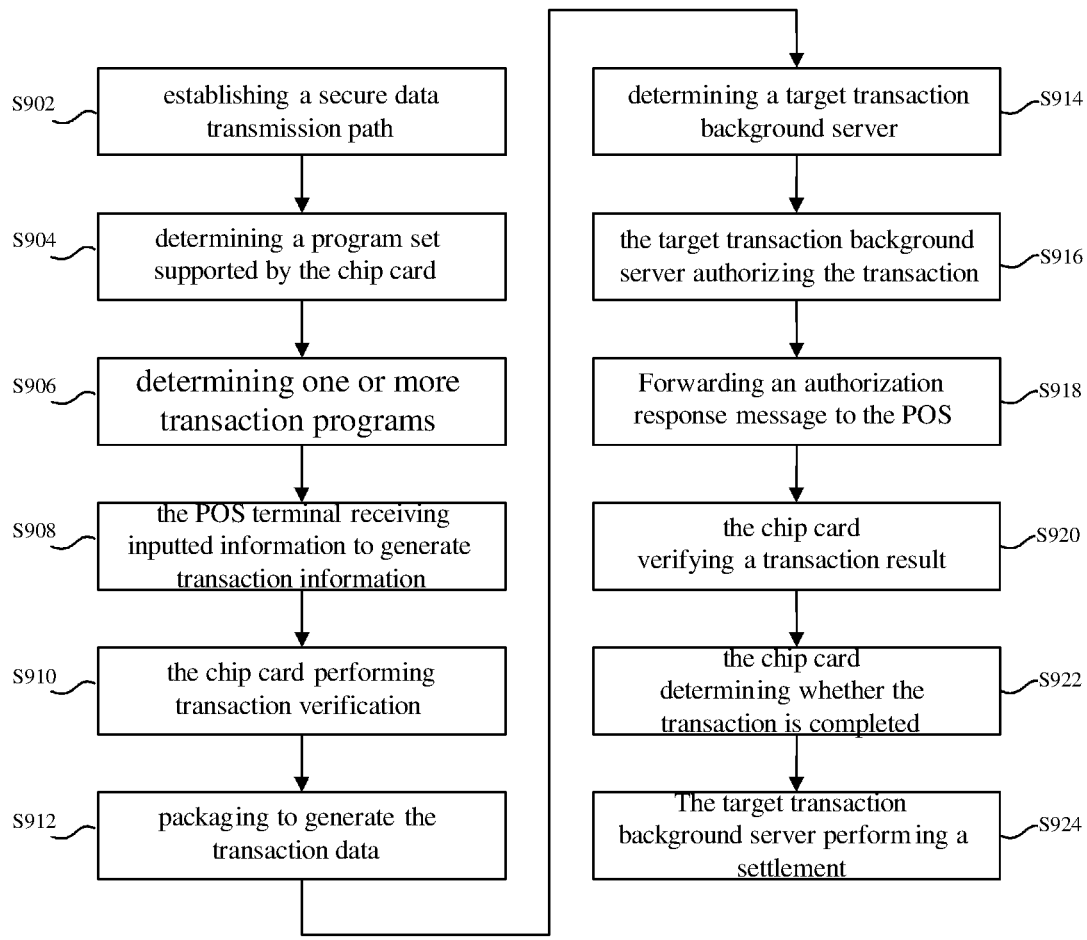
FIG. 9 is a flow chart of an integrated transaction of a data processing method according to an embodiment of the present disclosure.
Figure 10:
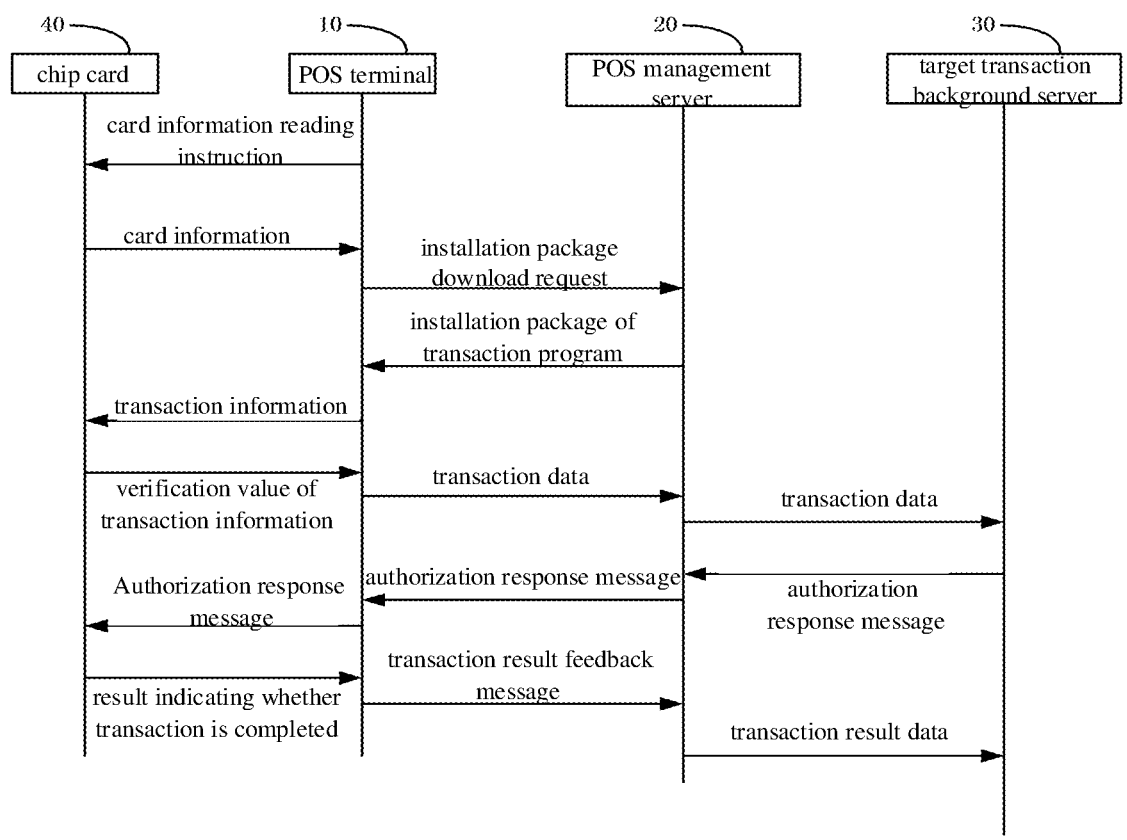
FIG. 10 is a schematic diagram of a data interaction of a data processing method according to an embodiment of the present disclosure.

FIG. 9 is a flow chart of an integrated transaction of a data processing method according to an embodiment of the present disclosure. FIG. 10 is a schematic diagram of a data interaction of a data processing method according to an embodiment of the present disclosure. The flow of the integrated transaction is applicable to the POS transaction system mentioned above. Data processing and interaction procedures of a chip card 40, a POS terminal 10, a POS management server 20 and a transaction background server 30 are illustrated in the flow charts. On the basis of descriptions made to the data processing method according to embodiments of the present disclosure, as illustrated in FIG. 9 and FIG. 10, an alternative integrated flow of performing a transaction by using the POS terminal may include the followings.

In block S902, a secure data transmission path is established between the POS terminal 10 and the POS management server 20. Establishing the secure data transmission path by the POS terminal 10 and the POS management server 20 includes flows of authenticating each other and negotiating a pair of session keys. Similarly, establishing the secure data transmission path between the POS management server 20 and the transaction background server 30, the POS management server 20 and the transaction background server 30 need to verify each other and negotiate a corresponding pair of session keys.

The pair of session keys includes an encryption key and a decryption key. The encryption key and the decryption key may be symmetric keys. During a process of transmitting data with the POS terminal, data to be sent to the POS terminal may be encrypted with the calculated encryption key and data from the POS terminal may be decrypted with the calculated decryption key, thereby improving security of the data transmission with the POS terminal.

In a particular implementation, a first random factor (e.g. a random number) may be carried in the authentication request sent by the POS terminal. After the POS management server 20 verifies the authentication information of the POS terminal successfully, the POS management server 20 may generate a second random factor and the second random factor is carried in the feedback message to feed back to the POS terminal. Then the POS management server 20 may generating the pair of session keys according to the first random factor and the second random factor by adopting a preset password generation algorithm. The POS terminal may also generate the pair of session keys according to the first random factor and the second random factor by adopting the preset password generation algorithm, and use the pair of session keys in subsequent data transmission for encrypting. Certainly, the present disclosure is not limited thereto. In practice, after the POS terminal may be authenticated successfully by the POS management server 20, the POS management server 20 may generate the pair of session keys according to the first random factor and the second random factor by adopting the preset password generation algorithm and send the pair of session keys to the POS terminal. Alternatively, the POS terminal may generate the pair of session keys and notify the pair of session keys to the POS management server 20, which is not limited in embodiments of the present disclosure.

In block S904, a program set supported by the chip card 40 is determined by the POS terminal 10. When a consumer wants to perform a transaction, after the chip card 40 is inserted into a chip card interactive interface 101, a card information reading instruction is performed on the chip card 40 by the POS terminal 10 to read card information of the chip card 40. The card information includes a list of transaction programs supported by the chip card 40. The chip card 40 returns the card information (including the list of transaction programs supported by the chip card 40) to the POS terminal 10.

In block S906, one or more transaction programs are acquired by the POS terminal 10. The POS terminal 10 determines whether the one or more transaction programs have been installed. If the one or more transaction programs have been installed, the one or more transaction programs are read and run so as to process the transaction. If the one or more transaction programs have not been installed, the POS terminal 10 sends a download request of the one or more transaction programs to the POS management server 20, receives an installation package in response to the download request returned by the POS management server 20, and installs the corresponding one or more transaction programs by using the installation package.

In block S908, the POS terminal 10 receives inputted information to generate transaction information. The inputted information may include a transaction amount and a transaction type inputted by an operator of the transaction, and PIN inputted by a holder of the chip card 40. The POS terminal 10 generates the transaction information by using the inputted information, and returns the transaction information to the chip card 40.

In block S910, the chip card 40 performs transaction verification. The transaction verification may include generating a verification value by processing the transaction information with a pair of keys and the like.

In block S912, the POS terminal 10 packages to generate the transaction data. The POS terminal 10 packages the verification value, the inputted information, an identifier of the POS terminal 10 and other information as the transaction data according to a format preset by the one or more transaction programs, and uploads the transaction data to the POS management server 20.

In block S914, the POS management server 20 determines a target transaction background server 30 corresponding to the transaction data, and sends the transaction data to the target transaction background server 30. The POS management server 20 may determine the target transaction background server 30 according to the identifier of the one or more transaction programs for generating the above transaction data. The identifier of the one or more transaction programs may be included in the transaction data or may be separately uploaded by the POS terminal before transmitting the transaction data between the POS terminal 10 and the POS management server 20.

In block S916, the transaction is authorized by the target transaction background server 30, and an authorization response message in response to the transaction data is fed back to the POS management server 20.

In block S918, the POS management server 20 forwards the authorization response message to the POS terminal 10. The POS management server 20 may, after the above authorization response message is received, determine a corresponding POS terminal 10 according to the identifier of the POS terminal, to forward the authorization response message to the corresponding POS terminal 10.

In block S920, the chip card 40 verifies a transaction result and generates a transaction confirmation feedback message in response to the authorization response message. The POS terminal 10 feeds the authorization response message back to the chip card 40, such that the chip card 40 verifies an authorization response code value included in the authorization response message. The transaction confirmation feedback message is generated as result data indicating whether the current transaction is completed, when the authorization response code value is verified successfully.

In block S922, the POS management server 20 determines whether the current transaction is completed according to a response of the chip card 40 to the authorization response message, and transmits the result data indicating whether the current transaction is completed to the target transaction background server 30.

In block S924, the target transaction background server 30 performs a settlement.

Figure 11:
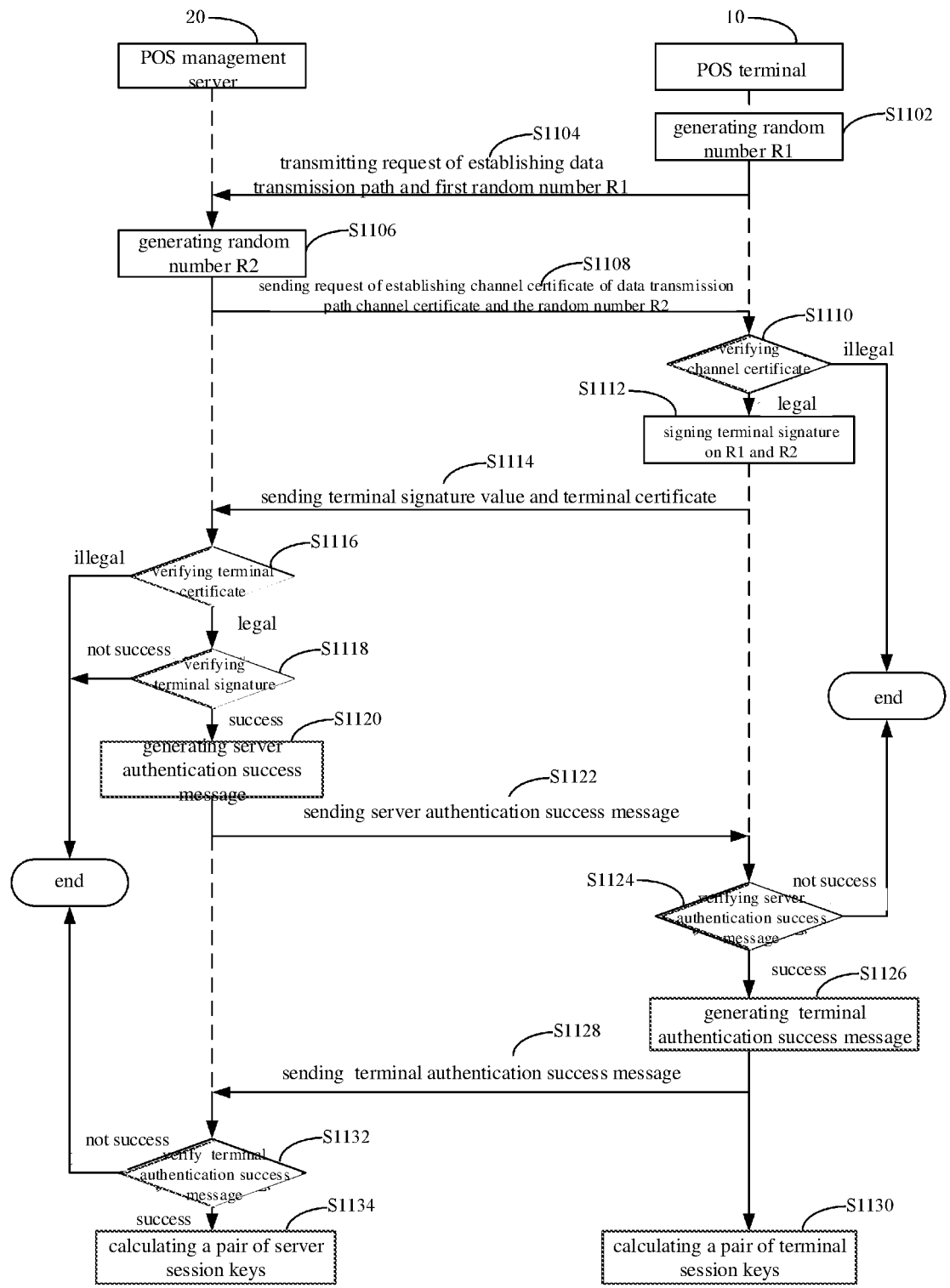
FIG. 11 is a flow chart of establishing a secure data transmission path of a data processing method according to an embodiment of the present disclosure.

FIG. 11 is a flow chart of establishing a secure data transmission path of a data processing method according to an embodiment of the present disclosure, which is applicable to the above POS transaction system. After the POS terminal 10 is installed firstly, through the flow of establishing a secure data transmission path, the POS terminal 10 and the POS management server 20 may establish the secure data transmission path. Detailed execution flow includes the followings.

In block S1102, the POS terminal 10 generates a first random number R1.

In block S1104, the POS terminal 10 transmits a request of establishing a data transmission path and the first random number R1 to the POS management server 20.

In block S1106, the POS management server 20 generates a second random number R2.

In block S1108, the POS management server 20 sends a request of establishing a channel certificate of the data transmission path and the second random number R2 to the PS 10.

In block S1110, POS terminal 10 verifies the channel certificate and stops a flow of establishing the path if the channel certificate is illegal.

In block S1112, if the channel certificate is verified successfully by the POS terminal 10, the POS terminal 10 signs a terminal signature on R1 and R2.

In block S1114, the POS terminal 10 sends a terminal signature value and a terminal certificate to the POS management server 20.

In block S1116, the POS management server 20 verifies the terminal certificate.

In block S1118, the POS management server 20 verifies the terminal signature. When one of the terminal certificate in block S1116 and the terminal signature in block S1118 is illegal or is verified unsuccessfully, the flow of establishing the path is stopped by the POS management server 20. A sequence of the block S1116 and the block S1118 may be adjustment flexibly. In some alternative occasions, the block S1118 may be executed before executing the block S1116.

In block S1120, the POS management server 20 generates a server authentication success message when the POS management server 20 determines that the terminal certificate is legal and the terminal signature is verified successfully.

In block S1122, the POS management server 20 sends the server authentication success message to the POS terminal 10.

In block S1124, the POS terminal 10 verifies the server authentication success message, and stops the flow of establishing the path if the server authentication success message is verified unsuccessfully.

In block S1126, the POS terminal 10 generates a terminal authentication success message if the server authentication success message is verified successfully.

In block S1128, the POS terminal 10 sends the terminal authentication success message to the POS management server 20.

In block S1130, the POS terminal 10 calculate a pair of terminal session keys for decrypting in data communication.

In block S1132, the POS management server 20 verifies the terminal authentication success message and stops the flow of establishing the path if the terminal authentication success message is verified unsuccessfully.

In block S1134, the POS management server 20 calculates a pair of server session keys for decrypting data sent by the POS terminal 10 in the data communication and for encrypting data to be sent to the POS terminal 10.

Through the above flows, the POS terminal 10 is verified by the POS management server 20 to avoid an illegal terminal access. Furthermore, by negotiating the pair of session keys for decrypting interactive data in subsequent data communication, security of the data path is guaranteed, thereby improving security of the card-swiping transaction.

In addition, the POS management server 20 may also establish the data transmission path with the transaction background server 30 through similar flows.

After the secure data transmission path is established between the POS terminal 10 and the POS management server 20, the POS terminal 10 enters to a transaction allowable state and may allow the card-swiping transaction. During the transaction, if one or more transaction programs for operating the current transaction have not been installed in the POS terminal 10, it needs to download an installation package from the POS management server 20 and install the one or more transaction programs according to the installation package.

Figure 12:
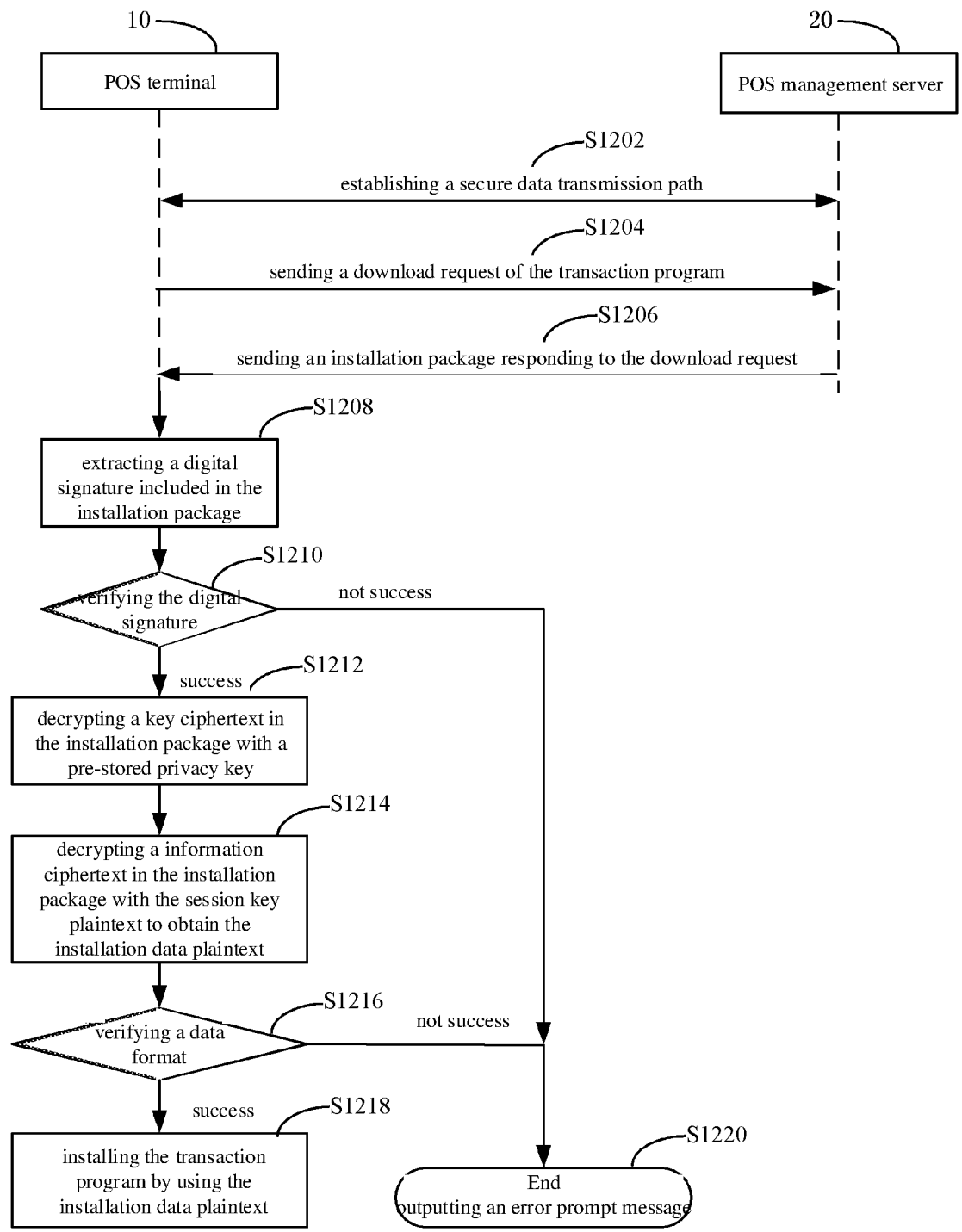
FIG. 12 is a flow chart of downloading a transaction program of a data processing method according to an embodiment of the present disclosure.

FIG. 12 is a flow chart of extending a transaction program of a data processing method according to an embodiment of the present disclosure, which is applied to the POS transaction system. As illustrated in FIG. 12, during a process of downloading and installing the transaction program, the POS terminal 10 and the POS management server 20 may perform the followings.

In block S1202, a secure data transmission path is established between the POS terminal 10 and the POS management server 20. Details may be illustrated as FIG. 11.

In block S1204, the POS terminal 10 sends a download request of the transaction program to the POS management server 20.

In block S1206, the POS management server 20 receives the download request of the transaction program sent by the POS terminal 10, determines the transaction program from a program set pre-stored according to the download request, encrypts the transaction program to generate an installation package in response to the download request, and sends the installation package to the POS terminal 10.

In block S1208, the POS terminal 10 receives the installation package, extracts a digital signature included in the installation package. A key ciphertext and an information ciphertext may be obtained by opening a digital envelope of the installation package in this block.

In block S1210, the POS terminal 10 verifies the digital signature of the POS management server 20 included in the installation package.

In block S1212, if the digital signature is verified successfully, the key ciphertext is decrypted with a pre-stored privacy key to obtain a session key plaintext of the POS management server 20. The key ciphertext is encrypted with a public key corresponding to the pre-stored privacy key by the POS management server 20.

In block S1214, the information ciphertext included in the installation package is decrypted with the session key plaintext to obtain the installation data plaintext.

In block S1216, a data format of the installation data plaintext is verified.

In block S1218, if the data format is verified successfully, the transaction program is installed by using the installation data plaintext that is verified successfully for processing and transmitting the transaction data.

In block S1220, if the digital signature is verified unsuccessfully in block S1210, or the data format is verified unsuccessfully in block S1218, the transaction program is stopped installing and an error prompt message is output.

Another way for stopping installing the transaction program is that the digital signature is verified unsuccessfully in block S1210 or the data format is verified unsuccessfully in block S1218, the POS terminal 10 may repeat downloading the installing package for several times, and the error prompt message is output if the verifications is continuously unsuccessful.

Processes of sending the download request to the POS management server 20 and decrypting and installing when the transaction program for processing the current transaction has not been installed in the POS terminal 10 are described above. In addition to downloading according to the download request of the POS terminal 10, the POS management server 20 may further push an installation package of the transaction program. For example, after the POS terminal 10 is verified successfully, the POS management server 20 may push a primary installation package of the transaction program to the POS terminal 10 for installing by the POS terminal 10. Alternatively, for example, the POS management server 20 may push an updated version of the transaction program to the POS terminal 10 after a transaction program updated by the transaction background server 30 is received.

The data processing method, the data processing device and the POS transaction system according to embodiments of the present disclosure may process transactions of various chip cards, such as bank cards, prepaid cards, transportation cards and the like, to realize transaction functions such as payment, transferring, refund and the like. A transaction of a municipal transportation card is taken as an example for illustration.

Firstly, secure data transmission paths are established via network between the POS terminal and the POS management server and between the POS management server and a municipal transportation background respectively. A card holder performs a card-swiping transaction with the POS terminal via a contacted or a contactless manner to establish the connection between the municipal transportation transaction card and the POS terminal. The POS terminal reads a list of supported transaction programs pre-stored in the municipal transportation IC (integrated circuit) card. The POS terminal inquires whether a transaction program included in the list of the supported transaction programs has been installed.

When the transaction program has not been installed, the POS terminal sends a download request to the POS management server. The POS management server returns a program installation package in response to the download request to the POS terminal for installing by the POS terminal.

When the transaction program has been installed or after the installation of the transaction program is completed, the POS terminal launches the transaction program. The card holder inputs PIN, and the POS terminal is ready to send inputted information to the municipal transportation IC card. The municipal transportation IC card generates and sends first ciphertext information M1 (M1 is transaction information) to the POS terminal.

The POS terminal sends an authorization request containing the first ciphertext information M1 to the municipal transportation transaction background. The municipal transportation transaction background verifies the PIN and the first ciphertext information, and generates an authorization response message if the PIN and the first ciphertext information are verified successfully. The authorization response message includes an authorization response generated by a card issuer. The POS management server and the POS terminal return the authorization response to the municipal transportation IC card.

The municipal transportation IC card verifies the authorization response and generates and sends second ciphertext information M2 (M2 is a transaction result) and a signature to the POS terminal.

The POS terminal verifies the signature, and reports the transaction result to the municipal transportation transaction background. The above is merely to describe a flow of swiping the municipal transportation IC card. Other types of chip cards and other transaction types may be processed in a similar way.

It can be seen from the above, the POS transaction system according to the embodiment is configured with the POS management server and the POS terminal. Different transaction programs may run on the same POS terminal to process transaction data of different types of chip cards. When the POS management server receives the transaction data sent by the POS terminal, the transaction background server corresponding to the current transaction is determined from a plurality of transaction background servers according to the transaction data, such that an authorization operation is performed on the transaction background server, thereby realizing data forwarding between a plurality of POS terminals and a plurality of POS management servers, improving the convenience of the card-swiping transaction and reducing transaction cost of the card-swiping transaction.

Further, in the POS transaction system according to the embodiment, an un-configured transaction program is downloaded by the POS terminal from the POS management server, thereby improving extensibility of the POS terminal and improving flexibility of the POS terminal.

Further, the POS transaction system according to the embodiment, adopts a plurality of security arrangements to guarantee security of the data transmission, which securely controls in multiple aspects, such as transmission channel, data legitimacy, data integrity and terminal security certification, to guarantee complete and legal data interaction, thereby improving transaction security and meeting payment requirements.

Embodiments of the present disclosure provide a computer program. When the computer program runs in a processor, a data processing method foregoing related is executed.

In the description provided herein, numerous specific details are provided. However, it is to be understood that embodiments of the present disclosure may be implemented without these specific details. In some examples, well-known methods, structures and techniques are not illustrated in detail in order not to obscure understandings of the description.

Similarly, it should be understood that in the foregoing description on exemplary embodiments of the present disclosure, various features of the present disclosure are sometimes grouped together into a single embodiment, a single figure or descriptions thereof to simplify the disclosure and facilitate understanding one or more of aspects of the present disclosure. However, the present disclosure should not be construed as reflecting the followings intentions that the claimed application requires more features than that are expressly recited in claims. Rather, as reflected by the claims, the aspects of the present disclosure are less than all features of the single foregoing disclosed embodiment. Thus, the claims following the Detailed Description are hereby expressly incorporated into this Detailed Description, with each claim being a separate embodiment of the present disclosure.

It may be understood by those skilled in the art that modules in a device according to embodiments may be adaptively changed and disposed in one or more devices different from the embodiments. Modules, units or components in embodiments may be combined into one module, unit or component. In addition, they may be divided into multiple submodules, subunits or subcomponents. All features disclosed herein, and all processes or elements of any method or device as disclosed, may be combined in any combination, except that at least some of such features and/or processes or elements are mutually exclusive. Unless specified otherwise, each feature disclosed in the specification may be replaced by an alternative feature providing the same, equivalent or similar purpose.

Various component embodiments of the present disclosure may be implemented via hardware or via software modules running in one or more processors or via a combination thereof.

Up to now, those skilled in the art should appreciate that, although a plurality of exemplary embodiments of the present disclosure are illustrated and described in detail herein, many other variations or modifications consistent with the principles of the present disclosure may be derived from the disclosure without departing from the spirit and scope of the present disclosure. Therefore, the scope of the present disclosure should be understood and recognized as covering all these other variations or modifications.

What is claimed is:

1. A data processing method, applied to a POS terminal, comprising:
   reading card information pre-stored in a chip card transacting with the POS terminal, wherein the card information comprises information of a program set for processing transaction data of the chip card, the program set at least comprises one or more transaction programs, each of the one or more transaction programs is configured to implement one or more businesses supported by the chip card;
   acquiring one or more transaction programs matching with a current transaction in the program set according to the card information, which comprises:
      inquiring whether the one or more transaction programs have been installed according to the card information;
      if yes, reading the one or more transaction programs installed; and
      if no, sending a download request of the one or more transaction programs to a POS management server communicatively connected to the POS terminal, receiving an installation package returned by the POS management server in response to the download request, and installing the one or more transaction programs by using the installation package, which comprises:
         verifying a digital signature included in the installation package;
         decrypting the installation package to obtain an installation data plaintext after the digital signature is verified successfully;
         verifying a data format of the installation dta plaintext, and
         installing the one or more transaction programs by using the installation data plaintext verified successfully; and
   running the one or more transaction programs to calculate and transmit transaction data of the current transaction.

2. The method according to claim 1, further comprising:
   outputting an error prompt message in a case that the digital signature is verified unsuccessfully or the data format of the installation data plaintext is verified unsuccessfully.

3. The method according to claim 1, wherein decrypting the installation package comprises:

opening a digital envelope of the installation package to obtain a key ciphertext and an information ciphertext;

decrypting the key ciphertext comprised in the installation package with a pre-stored privacy key to obtain a session key plaintext, wherein the key ciphertext is encrypted with a public key corresponding to the pre-stored privacy key by the POS management server; and decrypting the information ciphertext comprised in the installation package with the session key plaintext to obtain the installation data plaintext.

4. A data processing device, applied to a POS terminal, comprising:

a memory having computer-executable instructions stored thereon; and a processor, which is configured to execute the instructions to:

read card information pre-stored in a chip card transacting with the POS terminal, wherein the card information comprises information of a program set for processing transaction data of the chip card, the program set at least comprises one or more transaction programs, each of the one or more transaction programs is configured to implement one or more businesses supported by the chip card;

acquire one or more transaction programs matching with a current transaction in the program set according to the card information; and run the one or more transaction programs to calculate and transmit transaction data of the current transaction;

wherein the processor is further configured to:

inquire whether the one or more transaction programs have been installed according to the card information;

read the one or more transaction programs installed when it is inquired by the inquiring submodule thata the one or more transaction programs have been installed;

when it is inquired by the inquiring submodule that the one or more transaction programs have not been installed, send a download request of the one or more transaction programs to a POS management server communicatively connected to the POS terminal, and receive an installation package returned by the POS management server in response to the download request; and install the one or more transaction programs by using the installation package, which comprises:

verifying a digital signature include in the installation package;

decrypting the installation package to obtain an installation data plaintext after the digital signature is verified successfully; and verifying a data format of the installation data plaintext, and intalling the one or more transaction programs by using the installation data plaintext verified successfully.

5. The device according to claim 4, wherein the processor is further configured execute the instructions to:

output an error prompt message in a case that the digital signature is verified unsuccessfully or the data format of the installation data plaintext is verified unsuccessfully.

6. The device according to claim 4, wherein the processor is further configured execute the instructions to:

open a digital envelope of the installation package to obtain a key ciphertext and an information ciphertext;

decrypt the key ciphertext comprised in the installation package with a pre-stored privacy key to obtain a session key plaintext, wherein the key ciphertext is encrypted with a public key corresponding to the pre-stored privacy key by the POS management server; and decrypt the information ciphertext comprised in the installation package with the session key plaintext to obtain the installation data plaintext.

7. The device according to claim 4, wherein the processor is further configured to execute the instructions to:

send an authentication request to a POS management server communicatively connected to the POS terminal, and to set the POS terminal to a transaction allowable state after a response message indicating a success authentication sent by the POS management server is received.

8. The device according to claim 4, wherein the processor is further configured to execute instructions to:

receive transaction information from an interactive interface of the POS terminal;

transmit the transaction information to the chip card, and to acquire a verification value of the transaction information verified by the chip card;

generate the transaction data according to a format arranged by the one or more transaction programs, wherein the transaction data at least comprises: the verification value, the transaction information and an identifier of the POS terminal;

transmit the transaction data to the POS management server, such that the transaction data is transmitted by the POS management server to a target transaction background server corresponding to the transaction data, and to receive an authorization response message from the target transaction background server in response to the transaction data and forwarded by the POS management server; and send the authorization response message to the chip card, such that the chip card verifies a transaction result according to the authorization response message.

9. The device according to claim 8, wherein the processor is further configured to execute instructions to:

determine whether the current transaction is completed according to a response of the chip card to the authorization response message, and to transmit result data indicating whether the current transaction is completed to the POS management server, such that the POS management server sends a report to the target transaction background server when it is determined that the transaction is completed according to the result data.

10. A data processing device, for processing card-swiping transaction data, comprising:

a memory having computer-executable instructions stored thereon; and a processor, which is configured by the instructions to implement at least one of:

acquire transaction data uploaded by a POS terminal, wherein the transaction data corresponds to a chip card transacting with the POS terminal, card information pre-stored in the chip card comprises information of a program set for processing the transaction data, the program set at least comprises one or more transaction programs, each of the oine or more transaction programs is configured to implement one or more businesses supported by the chip card;

determine a target transaction background server corresponding to the transaction data;

transmit the transaction data to the target transaction background server, such that an authorization operation is performed on the transaction data by the target transaction background server; and receive an authorization response message of the target transaction background server in response to the transaction data and forward the authorization response message of the target transaction background server in response to the transaction data to the POS terminal;

wherein the processor is further configured to:

receive a download request of one or more transaction programs send by the POS terminal, to determine the one or more transaction programs from a pre-stored program set according to the download request, to encrypt the one or more transaction programs to generate an installation package in response to the download request, and to send the installation package to the POS terminal, such that the POS terminal:

verifies a digital signature included in the installation package, decrypts the installation package to obtain an installation data plaintext after the digital signature is verified successfully, verifies a data format of the installation data plaintext, and installs the one or more transaction programs by using the installation data plaintext verified successfully.

11. The device according to claim 10, wherein the processor is further configured to execute the instructions to:

receive an authentication request sent by the POS terminal, and to establish a secure transmission path with the POS terminal according to the authentication request.

12. The device according to claim 11, wherein the processor is further configured to execute the instructions to:

acquire authentication information of the POS terminal comprised in the authentication request;

verify the authentication information of the POS terminal;

return a feedback message indicating a success authentication to the POS terminal if the authentication information of the POS terminal is verified successfully; and calculate a pair of session keys for a security transmission with the POS terminal, for transmitting data with the POS terminal.

13. The device according to claim 10, wherein the processor is further configured to execute the instructions to:

receive result data, sent by the POS terminal, indicating whether a current transaction is completed; and to send a report to the target transaction background server for a settlement when it is determined that the current transaction is completed according to the result data, such that the target transaction background server completes the settlement.

14. The device according to claim 10, wherein the processor is further configured to execute the instructions to determine the target transaction background server corresponding to the transaction data by acts of:

acquiring an identifier, uploaded by the POS terminal, of the one or more transaction programs for processing the current transaction; and selecting the target transaction background server corresponding to the transaction data according to the identifier of the one or more transaction programs.

15. A non-transitory computer-readable medium comprising a computer program including instructions stored thereon, which when the instructions of the computer program is executed by a processor of a POS terminal, the processor is configured to configures the POS terminal to perform a data processing method comprising acts of:

reading card information pre-stored in a chip card transacting with the POS terminal, wherein the card information comprises information of a program set for processing transaction data of the chip card, the program set at least comprises one or more transaction programs, each of the one or more transation programs is configured to implement one or more businesses supported by the chip card;

acquiring one or more transaction programs matching with a current transaction in the program set according to the card information, which comprises:

inquiring whether the one or more transaction programs have been installed according to the card information;

if yes, reading the one or more transaction programs installed; and if no, sending a download request of the one or more transaction programs to a POS management server communicatively connected to the POS terminal, receiving an installation package returned by the POS management server in response to the download request, and installing the one or more transaction programs by using the installation package, which comprises:

verifying a digital signature included in the installation package;

decrypting the installation package to obtain an installaition data plaintext after the digital signature is verified successfully; and verifying a data format of the installation data plaintext, and installing the one or more transaction programs by using the installation data plaintext verified successfully; and running the one or more transaction programs to calculate and transmit transaction data of the current transaction.

* * * * *